United States Patent [19]

Schnell

[11] Patent Number: 4,627,805
[45] Date of Patent: Dec. 9, 1986

[54] VERTICAL FOIL-BLOWING HEAD

[75] Inventor: Willi Schnell, Cologne, Fed. Rep. of Germany

[73] Assignee: Reifenhauser GmbH & Co., Troisdorf, Fed. Rep. of Germany

[21] Appl. No.: 646,608

[22] Filed: Aug. 31, 1984

[30] Foreign Application Priority Data

Sep. 3, 1983 [DE] Fed. Rep. of Germany ....... 3331832

[51] Int. Cl.[4] .......................................... B29C 47/24
[52] U.S. Cl. .............................. 425/72 R; 425/376 B; 425/381; 264/209.2; 264/312
[58] Field of Search ............. 425/72 R, 326.1, 376 B, 425/467, 380, 381; 264/40.6, 209.2, 312, 564, 503

[56] References Cited

U.S. PATENT DOCUMENTS

| | | | |
|---|---|---|---|
| 2,844,846 | 7/1958 | Kronholm | 425/72 R |
| 3,180,909 | 4/1965 | Looser | 425/326.1 |
| 3,762,853 | 10/1973 | Upmeier | 425/326.1 |
| 3,853,661 | 12/1974 | Sudo | 264/173 |
| 3,902,832 | 9/1975 | Gregory et al. | 425/72 R |
| 3,933,958 | 1/1976 | Hinrichs | 264/40.6 |
| 4,112,034 | 9/1978 | Nash et al. | 425/72 R |
| 4,115,048 | 9/1978 | Alderfer et al. | 425/72 R |
| 4,224,272 | 9/1980 | Klein | 425/380 |
| 4,236,884 | 12/1980 | Schott, Jr. | 425/72 R |
| 4,272,231 | 6/1981 | Schott, Jr. | 425/72 R |
| 4,420,451 | 12/1983 | Rasmussen | 425/376 B |
| 4,450,131 | 5/1984 | Martinek | 425/381 |

Primary Examiner—Jay H. Woo
Assistant Examiner—Timothy W. Heitbrink
Attorney, Agent, or Firm—Karl F. Ross; Herbert Dubno

[57] ABSTRACT

A vertical foil-blowing die head having a rotatable die is fed by a distributor which communicates centrally with a fixed member, and has a substantially horizontal distributor passage portion extending outwardly beyond the central air ducts for the blowing and cooling air and a vertical portion communicating with the die at a single orifice offset from the center or axis.

6 Claims, 2 Drawing Figures

VERTICAL FOIL-BLOWING HEAD

FIELD OF THE INVENTION

My present invention relates to a vertical foil-blowing head and, more particularly, to a foil-blowing head of the type having rotatable parts which are intended to distribute any irregularities in thickness.

BACKGROUND OF THE INVENTION

The blowing of foil utilizing a vertical blowing head generally requires the extrusion of a thin layer of thermoplastic melt between a core and a surrounding portion of an extrusion die so that a tubular plastic structure emerges from the die and can be expanded at the mouth of the die by a cooling fluid which is introduced into the tubular structure through the die and can be conducted via passages in the die from the inflated interior of the tube. The end of the tube is closed at a location spaced from the die so that the degree of expansion is a function of the pressure of the fluid and its flow rate.

During expansion the relatively thick walls of the tubular structure are stretched and thereby reduced in thickness to produce comparatively thin foils. The tubular foil web which is thereby produced can be flattened, slit, if desired, and/or fabricated into bags or other products.

A vertically oriented foil-blowing head of this type, i.e. for the production of thin-walled tubular foils of thermoplastic material, can comprise a stationary lower part provided with a connection to an extrusion worm or plasticizing press in which liquefaction of the thermoplastic material occurs and from which the thermoplastic is fed through an annular gap of the die to produce the tubular structure.

The die itself generally comprises a pair of members, namely, the core and the outer part, i.e. the ring, which define the annular gap and which are rotated.

A rotating feeder is provided for introducing the cooling and blowing air and discharges the cooling and blowing air, this device including passages extending through the core. A distributor is generally also used to free the thermoplastic material from the stationary inlet at which the head is connected to the extrusion press, at the annular passages from which the tubular structure emerges for blowing downstream of the movement of the die.

In earlier constructions of this type, the distributor had a central melt inlet passage and a manifold system communicating with the annular passage while the air feeder included an annular passage encircling the head.

This arrangement allowed the die and the air supply and discharge device to rotate about the axis of the head and hence distribute any irregularities in the thickness substantially uniformly around this axis. In practice, the distributor passage system either comprised a distributor cone or a number of distributor passage sections which were spaced apart around the perforation of the melt flow passage.

A major problem has been discovered with such systems, namely, the excessive and nonuniform cooling of the melt before it enters the annular passage in the die and certainly before it emerges therefrom, when, as in earlier systems, the cooling air passage has traversed the distributor for the melt.

This undesired cooling results in a texturing of the product and the formation of lines or rays in the blown foil which can be attributed to localized nonuniform cooling and which are detrimental to the appearance and mechanical strength of the product.

OBJECTS OF THE INVENTION

It is, therefore, the principal object of the present invention to provide a vertical blowing head whereby these disadvantages are avoided.

Another object of this invention is to provide a vertical foil-blowing head which allows the free cooling and blowing of air and its discharge without having to have the air traverse the distributor system in a manner which will cause excessive cooling and without having to have the distributor passage system traverse the cooling air unit in a manner which might be detrimental to the blown foil product.

It is still another object of this invention to provide a blow molding head which yields a more aesthetic and mechanically more stable product.

SUMMARY OF THE INVENTION

These objects and others which will become apparent hereinafter are attained, in accordance with the present invention, in a device which provides in a blow-molding head of the type described, a distributor whose distributor passage is connected to the aforementioned stationary central melt inlet, but has a substantially horizontal passage portion extending generally radially beyond the central ducts delivering the cooling air axially through the core and discharging the cooling air after it has been passed through the expanding tube, and substantially a vertical section communicating with this horizontal portion and the opening in a single eccentric outlet into the annular passage of the die. This outlet and the substantially vertical portion of the passage forming it thus orbit around the centrally disposed ducts which can communicate with the annular ducts for the cooling air surrounding the aforementioned orbit.

The axial ducts thus pass through the free unoccupied or empty central space of the distributor and these ducts can have radial connecting portions diametrically opposite the vertical portion of the distributor passage and communicating with the annular ducts. In the region of this free central space thermal insulation can be provided. In the head of the invention, therefore, the melt does not undergo any significant change over the horizontal and vertical passage section and indeed the thermal insulation need not be of any special type. However, even if some cooling does occur in the distributor passage, it will not result in texturing or temperature lines in the product since the same cooling effect applies to all of the melt which is introduced through a single opening into the annular compartment.

Naturally the annular passage and thus the shapes of the confronting portions of the core and the ring forming the die must be such as to ensure thorough mixing and uniform distribution of the melt before it reaches the mouth of the die.

The reference to a "substantially horizontal portion" of the distributor passage is intended to signify that in the best mode example of the invention this portion of the passage is precisely horizontal. However it also includes orientation of this portion of the passage in which it is inclined to the horizontal, e.g. at an angle of up to 45°.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
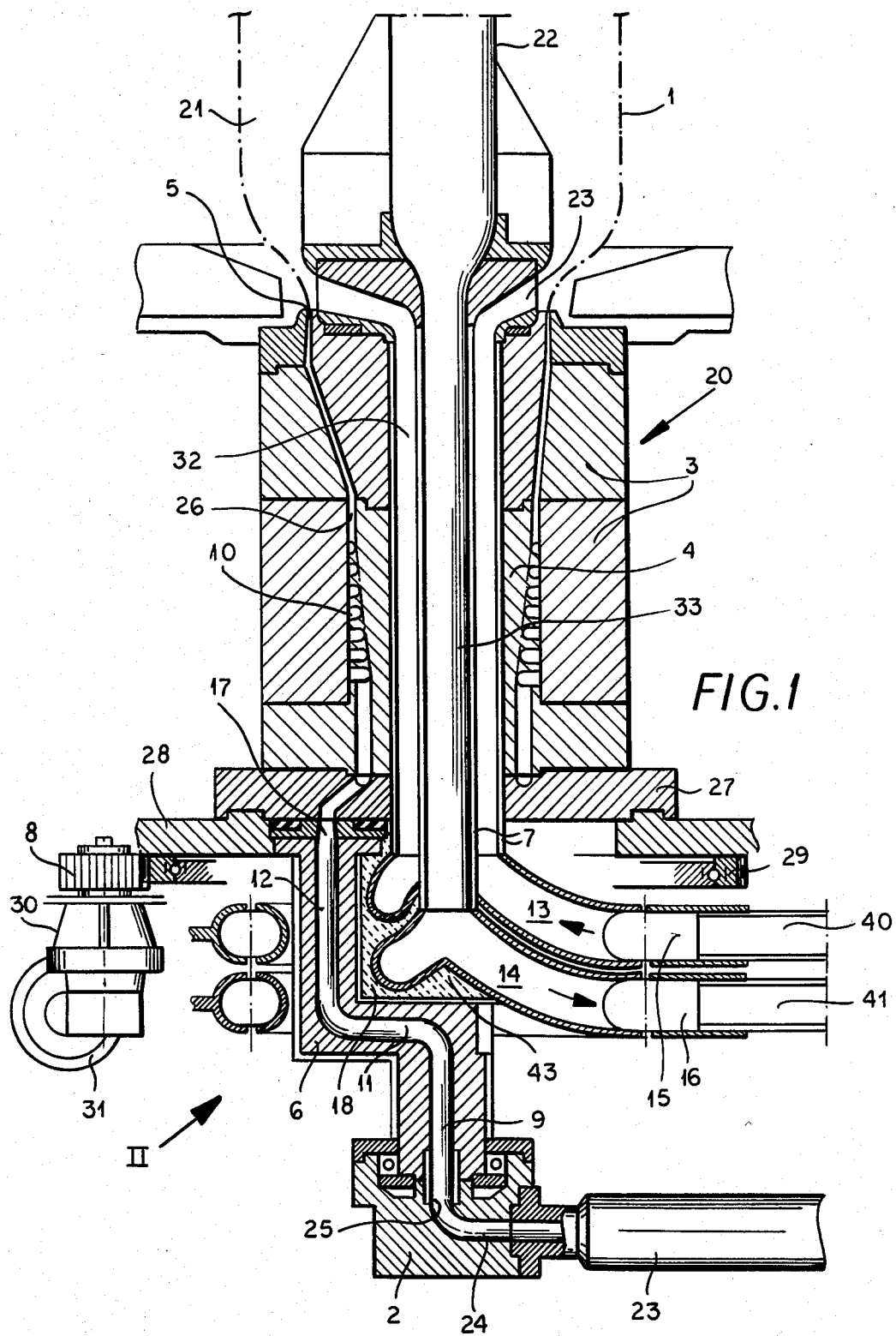
FIG. 1 is a vertical section, partly in diagrammatic form, of a foil-blowing head embodying the invention.

The foil-blowing head shown in FIGS. 1 and 2 operates vertically, i.e. the melt introduced from below into the foil-blowing head and a thermoplastic tubular structure emerges from the mouth 5 of the die 20 and is expanded by the air in a compartment 21 enclosed by the blown tube 1 which is closed off by passing it through the nip of a pair of rollers after the foil has cooled and at a location remote from the head shown. In this case, the blowing air, which also serves as cooling air, is drawn from the foil tube 1 at a location, not shown, also remote from the mouth 5. This tube has been represented at 22. Close to the mouth 5, an annular inlet 23 for the heated blowing air, serves to introduce the blowing air into the foil tube.

The head also comprises, in addition to the die 20, a stationary lower part 2 which receives the melt from an extruder 23 communicating horizontally with a passage 24 in the stationary lower part 2. This passage has an elbow to terminate in a vertical outlet 25.

The die 20 can comprise a number of die sections 3 forming the ring member of the die which surrounds a core 4, which also can be sectioned, the core member and the ring member defining an annular passage 26 which communicates between a distributor plate 27 and the mouth 5 of the die. The die 20 and the distributor plate are mounted for joint rotation on a support 28 connected with a ring gear 29 driven by a pinion 8 through stepped-down gearing 30 and an electrical motor 31.

A pair of coaxial ducts 7 communicate with the passages 22 and 23 previously mentioned to form a cooling air channel 32 and a return channel, respectively.

The ducts 7 have radial connecting branches 13 and 14 which open into annular ducts 15 and 16 communicating respectively with the air supply line 40 and the return line 41.

The distributor 6 is also retained by the drives 8, 29 and this drive can be continuous or discontinuous and unidirectional or reversing in direction. According to the invention, the distributor 6 has a central melt inlet 9 communicating with the stationary member 2 and extending into a horizontal portion 11 which, in turn, opens into a vertical portion 12, the latter communicating with a single eccentric bore 17 communicating with the annular passage 26. The latter can be provided with the fins, ribs or other formations, represented at 10, for ensuring thorough mixing of the plastic within the annular passage communicating with the mouth 5.

The assembly 13, 14, 7, furthermore, rotates with the distributor 6 and can be separated therefrom by a free space 18 forming insulation although thermal insulation can be supplied at 43 within this space as desired. In FIG. 2 the free space is shown at 18.

Figure 2:
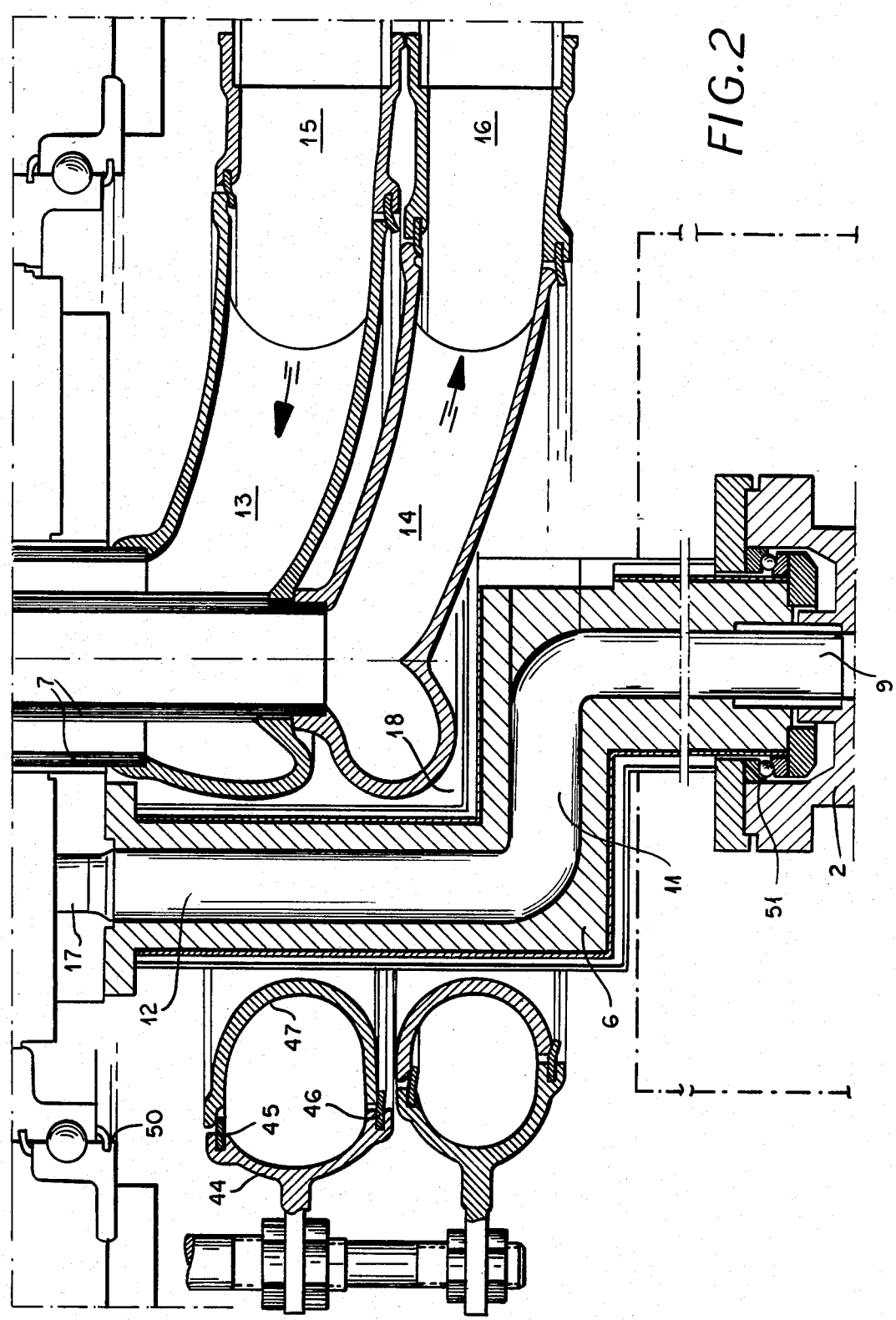
FIG. 2 is a detailed view of the portion II thereof.

As is also apparent from FIG. 2, the annular ducts 15 and 16 are each formed by an inwardly open substantially circular shell 44 carrying seals 45 and 46 which engage an outwardly open shell 47 carried by the retaining parts and in permanent communication with the radial branches 13 and 14. FIG. 2 also shows the combined thrust and radial bearing 50 supporting the rotatable parts, a further combined thrust and radial bearing being provided at 51 between the retaining parts 2 and the stationary member.

In operation, as the melt is fed through the distributor passage it in effect bypasses both the central air ducts and the peripheral air ducts so that cooling is minimal. Any cooling affects all of the melt which emerges from the mouth 5 and is blown into a tube in the usual manner. The airflow is represented by arrows.

I claim:

1. A vertical foil-blowing head comprising:
   a stationary lower part disposed along a vertical axis, connected with a source of a thermoplastic melt, said stationary lower part further having a vertical axial outlet for said melt;
   a foil-blowing rotatable die disposed above said stationary part along said axis and comprising a rotatable ring member and a rotatable core member defining a flow passage for said melt terminating in an annular mouth from which said melt engages to be blown into a foil tube;
   means for retaining said die about said axis;
   rotatable ducts extending through said rotatable core member along said axis and communicating with said foil tube for introducing blowing and cooling air into said foil tube and discharging said air therefrom;
   a rotatable distributor connecting said stationary part with said rotatable die, said rotatable distributor being provided with a distributor passage connected with said outlet, said rotatable distributor having a substantially horizontal portion extending outwardly beyond said rotatable ducts, and a substantially vertical portion connected to said substantially horizontal portion and opening into said flow passage at a single non-annular inlet orifice disposed outwardly of said ducts and offset from said axis; and
   wherein said rotatable ducts are provided with radial branches extending away from said rotatable distributor and communicating with annular channels for said air, said rotatable ducts being separated from said rotatable distributor by an insulating free space filled either with air or a thermal insulation material.

2. The vertical foil-blowing head defined in claim 1 wherein said annular channels surround said rotatable ducts.

3. The vertical foil-blowing head defined in claim 2 wherein said annular channels are inwardly open shells provided with respective seals engaging outwardly open shells connected with said radial branches.

4. The vertical foil-blowing head defined in claim 3, further comprising a bearing between said stationary part and said rotatable distributor.

5. The vertical foil-blowing head defined in claim 4 wherein said rotatable die is mounted on a plane provided with said single non-annular inlet orifice.

6. The vertical foil-blowing head defined in claim 5 wherein said rotatable die is provided with a ring gear meshing with a pinion, said pinion being driven to rotate said rotatable die.

* * * * *